United States Patent
Suzuki et al.

[11] Patent Number: 6,002,506
[45] Date of Patent: Dec. 14, 1999

[54] OPTICAL DEFLECTOR AND BEAM SCANNER USING THE SAME

[75] Inventors: Yuji Suzuki; Masaki Takahashi; Hideki Ito, all of Yokohama; Tamane Takahara, Bunkyo-ku, all of Japan

[73] Assignee: Kabushiki Kaisha Toshiba, Kawasaki, Japan

[21] Appl. No.: 09/095,580

[22] Filed: Jun. 11, 1998

[30] Foreign Application Priority Data

Jun. 11, 1997 [JP] Japan ..................................... 9-153160
Jun. 11, 1997 [JP] Japan ..................................... 9-153161

[51] Int. Cl.[6] .................................................. G02B 26/08
[52] U.S. Cl. .......................... 359/198; 359/204; 359/212; 359/216
[58] Field of Search ...................... 359/198, 199, 359/201, 202, 204, 212, 213, 214, 216, 217, 218, 219, 223, 226, 872

[56] References Cited

U.S. PATENT DOCUMENTS 5,276,545  1/1994  Daun et al. .............................. 359/198
5,428,473  6/1995  Takizawa et al. ....................... 359/199
5,731,888  3/1998  Arai ......................................... 359/204

FOREIGN PATENT DOCUMENTS 60-43230   3/1985  Japan .
62-129812  6/1987  Japan .
7-93783    4/1995  Japan .

*Primary Examiner*—Cassandra Spyrou
*Assistant Examiner*—Euncha Cherry
*Attorney, Agent, or Firm*—Oblon, Spivak, McClelland, Maier & Neustadt, P.C.

[57] ABSTRACT

An optical deflector of the present invention comprises: a mirror 20 for reflecting light; a yoke 24 for rotatably holding the mirror 20 via a plate spring 21; a coil 27 and a magnet 27 for rotating the mirror 20 with respect to the yoke 24; a magnet fixing plate 28 for holding the yoke 24; and positioning pins 31*a* and 31*b*, a part of which is inserted into the yoke 24, for positioning the yoke 24. The magnet 27 forms a magnetic circuit in the yoke 24. The positioning pins 31 and 31*b* are made of a magnetic material so as not to obstruct the magnetic circuit formed in the yoke 24.

8 Claims, 11 Drawing Sheets

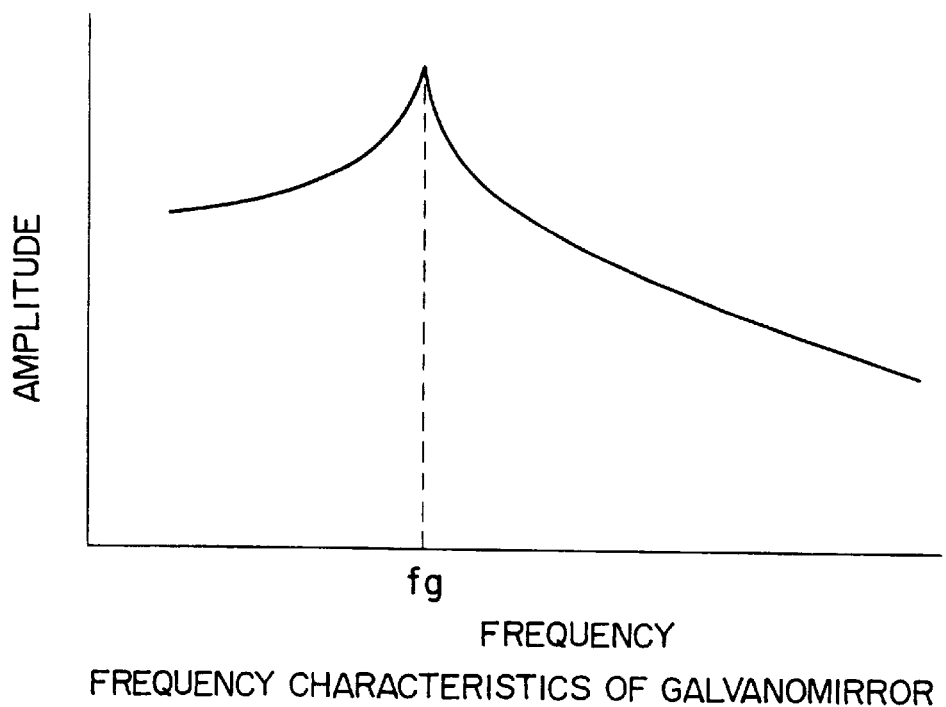
FREQUENCY CHARACTERISTICS OF GALVANOMIRROR
F I G. 7
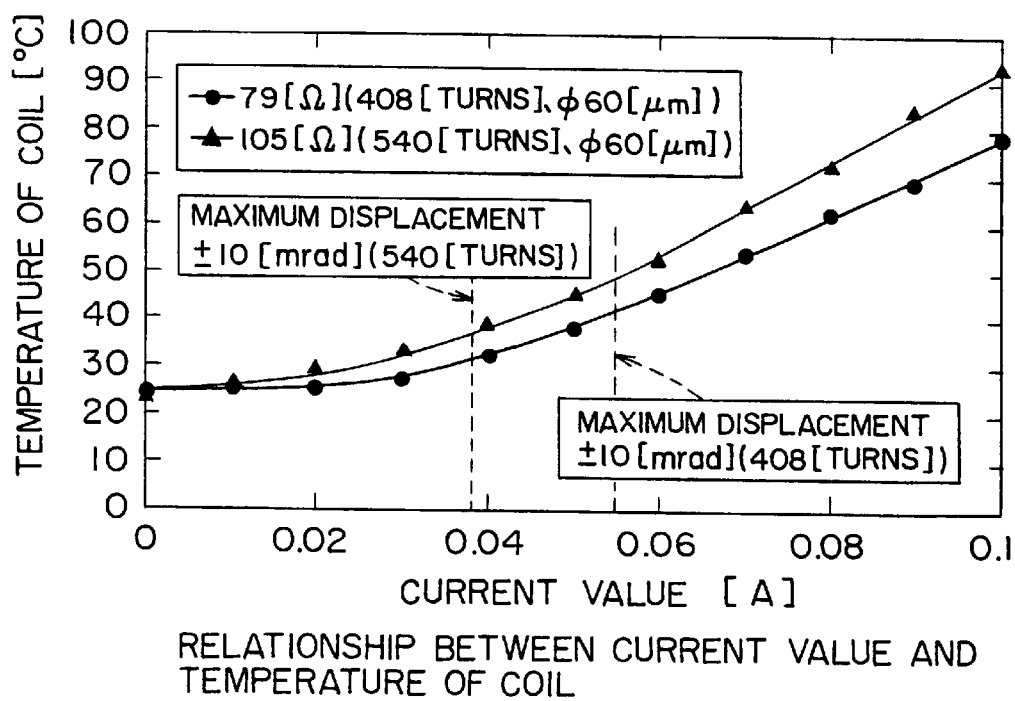
RELATIONSHIP BETWEEN CURRENT VALUE AND TEMPERATURE OF COIL
F I G. 8

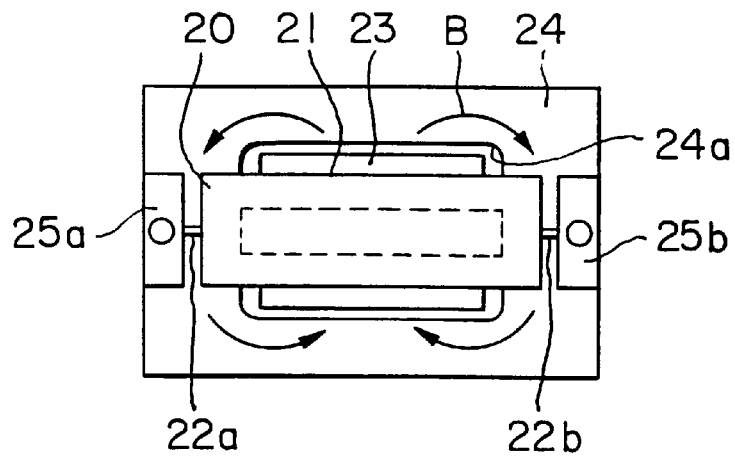
PRIOR ART  F I G. 13A
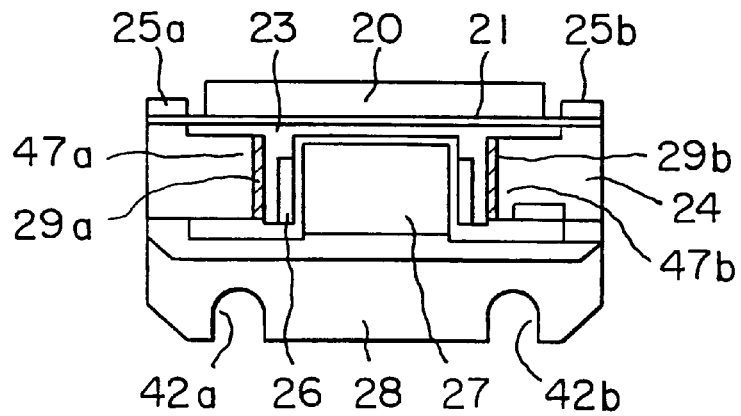
PRIOR ART  F I G. 13B
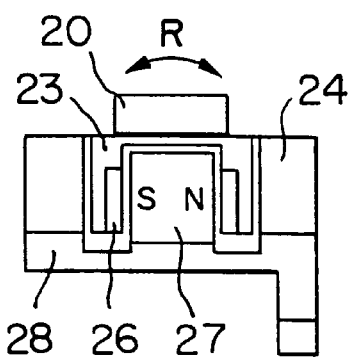
PRIOR ART  F I G. 13C

OPTICAL DEFLECTOR AND BEAM SCANNER USING THE SAME

BACKGROUND OF THE INVENTION

1. Field of The Invention

The present invention relates generally to an optical deflector for deflecting light, such as laser beams, by slightly displacing a light deflecting member, and a beam scanner using the optical deflector.

2. Related Background Art

In recent years, with the development of various apparatuses using laser beams or the like, various uses of optical deflectors have been developed. For example, optical deflectors are used for laser beam scanners of conventional laser printers which are output units capable of outputting any numbers of pages of picture and/or document information every page.

As a typical optical deflector, the construction of a conventional galvanomirror for use in a maltibeam scanner will be described below. FIG. 12 is a perspective view of a galvanomirror, FIGS. 13A through 13C are views showing three faces thereof, and FIG. 14 is an exploded perspective view thereof.

In FIGS. 12 through 14, a mirror (a light deflecting member) 20 for deflecting a laser beam is elastically supported on an elastic supporting member, which itself is slightly moved. This elastic supporting member is a plate spring (a supporting member) 21 which comprises: a portion mounted on the mirror 20; a portion mounted on a yoke 24 serving as a frame; and two torsion springs, i.e., torsion bar springs 22a and 22b, for connecting the portion mounted on the mirror 20 to the portion mounted on the yoke 24. The mirror 20 is bonded to the plate spring 21. The reflecting surface, i.e., the evaporation surface, of the mirror 20 is provided on one side of the mirror 20, the other side of which faces the plate spring 21.

The plate spring 21 is made of a beryllium copper or stainless, e.g., SUS304, which are often used as materials of a spring. A bobbin 23 is bonded to one surface of the plate spring 21, to the other surface of which the mirror 20 is bonded. A coil 26 is bonded to the inner surface of the bobbin 23. The plate spring 21 is fixed to the yoke (a holding member) 24 of a ferromagnetic material also serving as a frame, by means of plate spring presser members 25a and 25b of a resin. That is, the plate spring 21 is fixed to the yoke 24 by the engagement of screws (not shown) with threaded holes 40a and 40b formed in the yoke 24, holes 37a and 37b formed in the plate spring 21, and holes 41a and 41b, which are formed in the plate spring presser members 25a and 25b, respectively.

A magnet 27 is bonded to a magnet fixing plate (a base) 28 of a non-magnetic material, and fixed to the yoke 24 by the engagement of screws (not shown) with threaded holes (not shown) formed in the yoke 24 and holes 39a and 39b formed in the magnet fixing plate 28. The torsion bar springs 22a and 22b are provided on both sides of the plate spring 21 in longitudinal directions thereof, so that the mirror 20 is rotatable in the directions of arrows R (see FIGS. 12 and 13C).

When an electric current flows the coil 26, an electromagnetic force is produced between the coil 26 and the magnet 27 mounted on the magnet fixing plate 28 to rotate the mirror 20 in the directions of arrows R.

Specifically, referring to FIG. 15, the lines of magnetic force leave the N pole surface (a polarized surface) of the magnet 27 for the yoke 24, and then, the lines of magnetic force are divided by the yoke 24 into right and left parts as shown by arrows B to go half around the magnet 27 along the yoke 24 to reach the opposite S pole surface (a polarized surface) of the magnet 27.

When an electric current flows the coil 26 in this state, magnetic forces are applied to the linear portion of the coil 26 arranged at the magnetic gap between the magnet 27 and the yoke 24 on the side of the N pole surface and to the linear portion of the coil 26 on the side of the S pole surface, and the directions of the magnetic forces are opposite to each other.

Therefore, since the plate spring 21 is fixed to the yoke 24, the plate spring 21 rotates around the torsion bar springs 22a and 22b serving as torsion springs, and the mirror 20 also rotates in the directions of arrows R. Furthermore, if the direction of the electric current is changed, the direction of rotation can be changed, and the rotation angle can be changed in proportion to the current value. In addition, the rotation angle of the mirror 20 can be maintained by holding the passing current.

Referring to FIGS. 13A through 13C, the gaps between the yoke 24 and the bobbin 23 are filled with damping materials 29a and 29b of, e.g., silicon gel, so as to prevent the mirror 20 from being vibrated by disturbance vibration.

However, when a laser beam is scanned by the optical deflector with the above construction, there are the following problems.

That is, referring to FIG. 14, positioning pins (positioning members) 31a and 31b are inserted into positioning holes 38a and 38b of the magnet fixing plate 28 and positioning holes 33a and 33b of the yoke 24 in order to position the yoke 24 with respect to the magnet fixing plate 28. However, since the conventional positioning pins 31a and 31b are made of SUS304 or the like which is a non-magnetic material, there is a problem in that the lines of magnetic force passing through the yoke 24 are obstructed, so that the efficiency of a magnetic circuit formed in the yoke 24 is deteriorated.

In addition, referring to FIG. 15, the lines of magnetic force leave the N pole surface of the magnet 27 for the yoke 24, and then, the lines of magnetic force are divided by the yoke 24 into right and left parts as shown by arrows B to go half around the magnet 27 along the yoke 24 to reach the opposite S pole surface of the magnet 27. However, when the lines of magnetic force leave the N pole surface for the yoke 24, the lines of magnetic force go while being expanded since the area of a portion of the yoke 24 facing the N pole surface of the magnet 27 is greater than the area of the N pole surface. The side of the S pole is the same. Therefore, there is a problem in that the magnetic flux density at the coil 26 decreases so as to deteriorate the efficiency of the magnetic circuit.

In addition, referring FIG. 15, the lines of magnetic force leave the N pole surface of the magnet 27 for the yoke 24, and then, the lines of magnetic force are divided by the yoke 24 into right and left parts as shown by arrows B to go half around the magnet 27 along the yoke 24 to reach the opposite S pole surface of the magnet 27. However, there is some possibility that some lines of magnetic force returning to the magnet 27 without going half around the magnet 27 may occur at projections 47a and 47b which are provided in the yoke 24 for filling silicon gel so as to prevent the vibration. Therefore, there is a problem in that leakage flux may occur to deteriorate the efficiency of the magnetic circuit formed in the yoke 24.

SUMMARY OF THE INVENTION

As described above, in the conventional laser beam scanner, the efficiency of the magnetic circuit of the galvanomirror serving as an optical deflector is low, so that there is some possibility that desired performance can not be obtained.

It is therefore an object of the present invention to eliminate the aforementioned problems and to provide an optical deflector, which can improve the efficiency of a magnetic circuit to record a high quality picture, and a beam scanner using the optical deflector.

In order to accomplish the aforementioned and other objects, according to a first aspect of the present invention, an optical deflector comprises: a light deflecting member having a reflecting surface for reflecting light; a supporting member for supporting the light deflecting member; a holding member for holding the supporting member; a driving mechanism for rotating the light deflecting member with respect to the holding member; a base for supporting the holding member; and a positioning member, being made of a magnetic material, for positioning the holding member with respect to the base. In this case, the driving mechanism preferably forms a magnetic circuit in the holding member. In addition, the positioning member is preferably made of a magnetic material so as not to obstruct the magnetic circuit formed in the holding member.

According to a second aspect of the present invention, an optical deflector comprises: a light deflecting member having a reflecting surface for reflecting light; a supporting member for supporting the light deflecting member; a holding member for holding the supporting member, the holding member having an opening; and a driving mechanism, located in the opening of the holding member, for rotating the light deflecting member with respect to the holding member, the driving mechanism having a magnet and a coil, wherein a first overhanging portion projects from a surface of the opening of the holding member, the surface facing a polarized surface of the magnet. In this case, the first overhanging portion preferably has substantially the same area as that of the polarized surface of the magnet. In addition, a second overhanging portion of a non-magnetic material may projects from a surface of the opening of the holding member, the surface being not face a polarized surface of the magnet.

According to a third aspect of the present invention, a beam scanner comprises: a plurality of light sources; a plurality of optical deflectors for deflecting an emitting light from each of the light sources in a predetermined direction; and a scanner for scanning the light deflected by each of the optical deflectors, on a predetermined image surface at a constant speed, each of the optical deflector having a light deflecting member, having a reflecting surface for reflecting light, a supporting member for supporting the light deflecting member, a holding member for holding the supporting member, a driving mechanism for rotating the light deflecting member with respect to the holding member, a base for supporting the holding member, and a positioning member, being made of a magnetic material, for positioning the holding member with respect to the base. In this case, the driving mechanism preferably forms a magnetic circuit in the holding member. In addition, the positioning member is preferably made of a magnetic material so as not to obstruct the magnetic circuit formed in the holding member.

According to a fourth aspect of the present invention, a beam scanner comprises: a plurality of light sources; a plurality of optical deflectors for deflecting an emitting light from each of the light sources in a predetermined direction; and a scanner for scanning the light deflected by each of the optical deflectors, on a predetermined image surface at a constant speed, each of the optical deflector having a light deflecting member having a reflecting surface for reflecting light, a supporting member for supporting the light deflecting member, a holding member for holding the supporting member, the holding member having an opening, and a driving mechanism, located in the opening of the holding member, for rotating the light deflecting member with respect to the holding member, the driving mechanism having a magnet and a coil, wherein a first overhanging portion projects from a surface of the opening of the holding member, the surface facing a polarized surface of the magnet. In this case, the first overhanging portion preferably has substantially the same area as that of the polarized surface of the magnet. In addition, a second overhanging portion of a non-magnetic material may projects from a surface of the opening of the holding member, the surface being not face a polarized surface of the magnet.

According to the first and third aspects of the present invention, since the first lines of magnetic force passing through the holding member are not obstructed, it is possible to improve the efficiency of the magnetic circuit formed in the holding member.

According to the second and fourth aspects of the present invention, since the first overhanging portion projects from the surface of the opening of the holding member facing the polarized surface of the magnet, the magnetic flux density in the gap between the polarized surface of the magnet and the holding member is hardly decreased, and the leakage flux is hardly caused, so that it is possible to improve the efficiency of the magnetic circuit formed in the holding member. In addition, since the second overhanging portion of a non-magnetic material projects from the surface of the opening of the holding member, which does not face the polarized surface of the magnet, it is possible to prevent the leakage flux while maintaining a narrow gap in a portion filled with a damping material or the like, so that it is possible to improve the efficiency of the magnetic circuit formed in the holding member.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 7 is a graph showing the frequency characteristics of a galvanomirror serving as an optical deflector;

FIG. 8 is a graph showing the relationship between the current value and the temperature of a coil in a galvanomirror serving as an optical deflector;

FIGS. 13A, 13B and 13C are views showing three faces of the galvanomirror serving as the optical deflector for use in the conventional multi-beam scanner;

DESCRIPTION OF THE PREFERRED EMBODIMENTS

Referring now to the accompanying drawings, the preferred embodiments of an optical deflector and a beam scanner using the same, according to the present invention, will be described below.

First Preferred Embodiment

Figure 1:
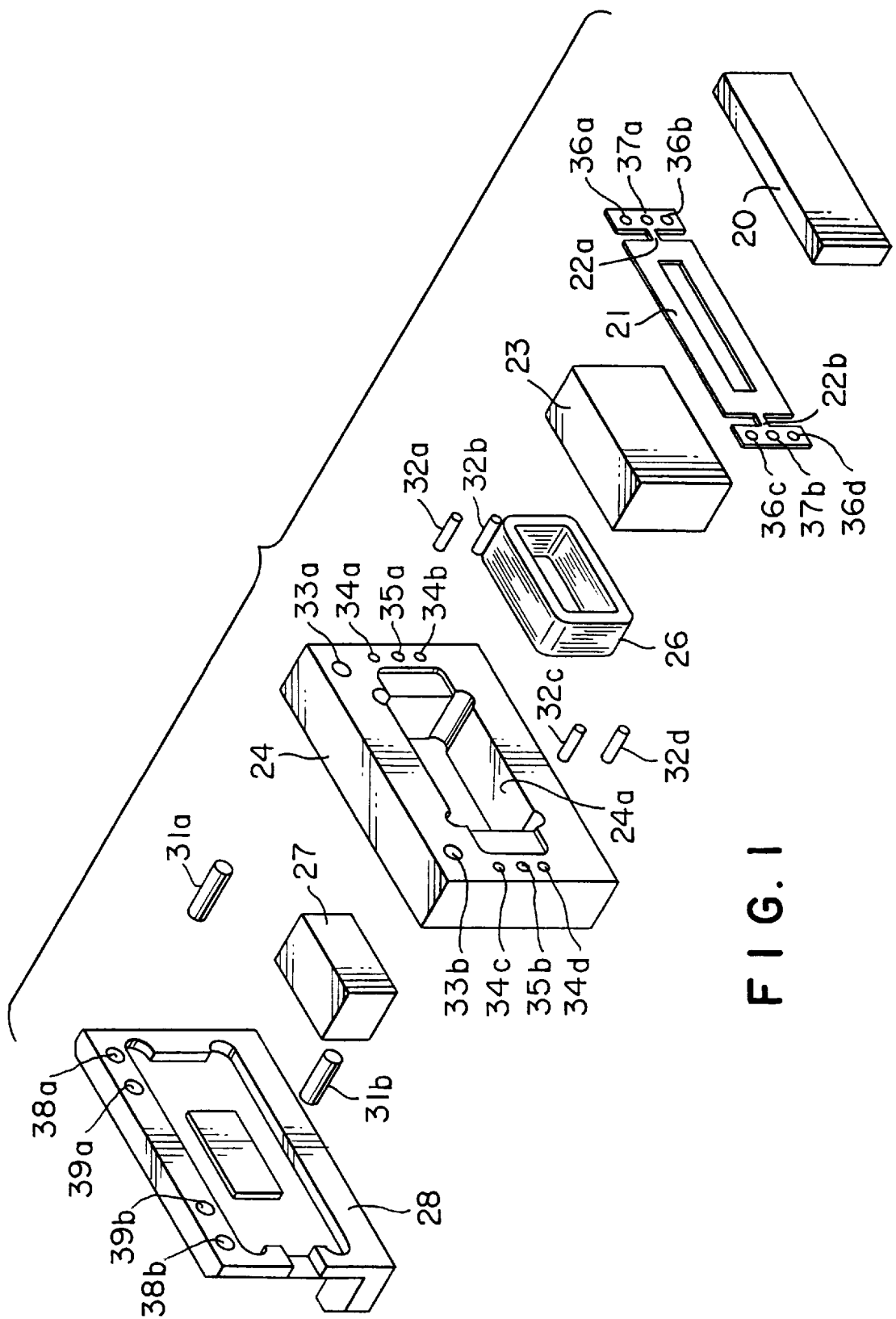
FIG. 1 is an exploded perspective view of the first preferred embodiment of an optical deflector according to the present invention.

FIG. 1 is an exploded perspective view of the first preferred embodiment of an optical deflector according to the present invention.

In FIG. 1, a mirror (a light deflecting member) 20 for deflecting light, such as laser beams, is mounted on one surface of a plate spring (a supporting member) 21. On the other surface of the plate spring 21, a bobbin 23 is mounted. In the bobbin 23, a coil 26 which is associated with a magnet 27 for forming a driving mechanism is provided.

In order to fix the plate spring 21 to a yoke (a holding member) 24, which has an opening 24a at the central portion thereof, by means of screws, the plate spring 21 has screwing holes 37a and 37b, and the yoke 24 has threaded holes 35a and 35b corresponding to the screwing holes 37a and 37b.

In addition, the plate spring 21 has positioning holes 36a, 36b, 36c and 36d. Similarly, the yoke 24 has positioning holes 34a, 34b, 34c and 34d. After inserting positioning pins 32a, 32b, 32c and 32d into these positioning holes to temporarily fix the plate spring 21 to the yoke 24 so as to prevent the movement thereof, the plate spring 21 is fixed to the yoke 24 by means of screws.

Thus, when the positioning pins 32a, 32b, 32c and 32d are inserted into the positioning holes 36a, 36b, 36c and 36d formed in the plate spring 21 and the positioning holes 34a, 34b, 34c and 34d formed in the yoke 24, the plate spring 21 is temporarily fixed to the yoke 24, so that torsion bar springs 22a and 22b serving as torsion springs of the plate spring 21 can be prevented from being bent when the plate spring 21 is fixed to the yoke 24 by means of screws.

The screwing holes 37a and 37b and the positioning holes 36a, 36b, 36c and 36d, which are formed in the plate spring 21, are preferably located as shown in FIG. 1. That is, the screwing holes 37a and 37b are preferably in alignment with the longitudinal directions of the torsion bar springs 22a and 22b, and the positioning holes 36a, 36b, 36c and 36d are preferably located on both sides of the screwing holes 37a and 37b so as to be spaced from each other in directions perpendicular to the longitudinal directions of the torsion bar springs 22a and 22b.

The positioning holes 36a, 36b, 36c and 36d and the screwing holes 37a and 37b, which are thus located, are positioned to temporarily fix the plate spring 21 to the yoke 24 by means of the positioning pins 32a, 32b, 32c and 32d, so that the positioning pins 32a, 32b, 32c and 32d are in contact with the positioning holes 37a, 37b, 37c and 37d even if the plate spring 21 is screwed on the yoke 24 in the assembly process. Therefore, the plate spring 21 and the yoke 24 function so as to be integrated with each other while the plate spring 21 are fixed to the yoke 24 by means of screws, so that it is possible to prevent undesired stress, such as torsional force, from being applied to the torsion bar springs 22a and 22b.

In addition, positioning pins (positioning members) 31a and 31b are used to position the yoke 24 and a magnet fixing plate (a base) 28. The yoke 24 and the magnet fixing plate 28 can be positioned by inserting common positioning pins 31a and 31b into the positioning holes 33a and 33b of the yoke 24 and positioning holes 38a and 38b of the magnet fixing plate 28.

The positioning pins 31a and 31b are made of a magnetic material. That is, although such positioning pins 31a and 31b have been conventionally made of a non-magnetic material, such as SUS304, the magnetic positioning pins of a stainless steel, such as SUS405 and SUS410, or a carbon steel, such as S15C, are used in the first preferred embodiment of the present invention.

The positioning holes 33a and 33b of the yoke 24 for receiving the positioning pins 31a and 31b are provided in the yoke 24, through which the lines of magnetic force pass. Therefore, if the conventional positioning pins of a non-magnetic material (e.g., SUS304) are used, the positioning pins may obstruct the lines of magnetic force forming a magnetic circuit. On the other hand, according to the first preferred embodiment of the present invention, the positioning pins 31a and 31b are made of a magnetic material, so that the efficiency of the magnetic circuit can be improved.

Although the positioning pins 31a and 31b of the magnetic material may be made of the same material as or a similar material to that of the yoke 24, the positioning pins 31a and 31b are preferably made of a stainless steel (e.g., SUS405 or SUS410) as described above in view of the hardness and workability of the material so that the positioning pins 31a and 31b function effectively. If the positioning pins 31a and 31b are made of a stainless steel, it is possible to sufficiently achieve the workability for obtaining the required positioning accuracy of the positioning pins 31a and 31b, e.g., the mirror working of the surfaces of the positioning pins 31a and 31b, and the required hardness of the positioning pins 31a and 31b.

Second Preferred Embodiment

Figure 2:
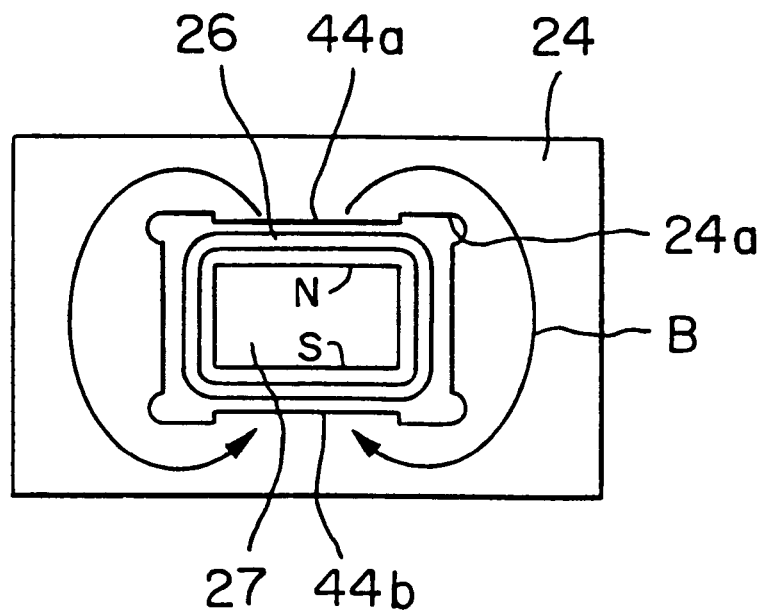
FIG. 2 is a plan view for explaining a magnetic circuit of a galvanomirror serving as the second preferred embodiment of an optical deflector according to the present invention.

FIG. 2 shows a principal part of the second preferred embodiment of an optical deflector according to the present invention.

As shown in FIG. 2, in the second preferred embodiment of the present invention, (first) overhanging portions 44a and 44b project from the surfaces of an opening 24a of a yoke 24 facing N and S pole surfaces (polarized surfaces) of a magnet 27.

Since the overhanging portions 44a and 44b project from the yoke 24, the gaps between the yoke 24 and the magnet 27 are smaller than those in other portions by the thickness of the overhanging portions 44a and 44b, i.e., the magnetic gaps are narrowed.

That is, the lines of magnetic force leave the N pole surface of the magnet 27 for the overhanging portion 44a, which projects from the yoke 24 to decrease the magnetic gap, and then, the lines of magnetic force are divided by the yoke 24 into right and left portions as shown by arrows B to go half around the magnet 27 along the yoke 24 to reach the opposite S pole surface of the magnet 27 via the overhanging portion 44b.

Thus, unlike conventional optical deflectors having no overhanging portions, the lines of magnetic force are not expanded to go toward the yoke 24. In addition, in conventional optical deflectors having no overhanging portions, when the lines of magnetic force B leave the N pole surface of the magnet 27 for the yoke 24, the lines of magnetic force going linearly may be mixed with the lines of magnetic force going obliquely, and the lines of magnetic force going obliquely may pass through the interior of the yoke 24 to leak out of the interior of the yoke 24 so as not to reach the surface of the yoke 24 facing the S pole surface of the magnet 27, so that the lines of magnetic force going obliquely do not reach the S pole surface of the magnet 27. According to this preferred embodiment of the present invention, it is possible to prevent such matters.

Therefore, according to the second preferred embodiment of the present invention, the magnetic flux density in the gaps between the yoke 24 and the N and S pole surfaces of the magnet 27 is hardly decreased, and She leakage flux is hardly caused, so that it is possible to improve the efficiency of the magnetic circuit formed in the yoke 24.

Furthermore, in order to decrease the leakage flux, the surfaces of the overhanging portions 44a and 44b facing the N and S pole surfaces of the magnet 27 preferably have substantially the same areas as those of the N and S pole surfaces of the magnet 27 as shown in FIG. 2.

Third Preferred Embodiment

Figure 3:
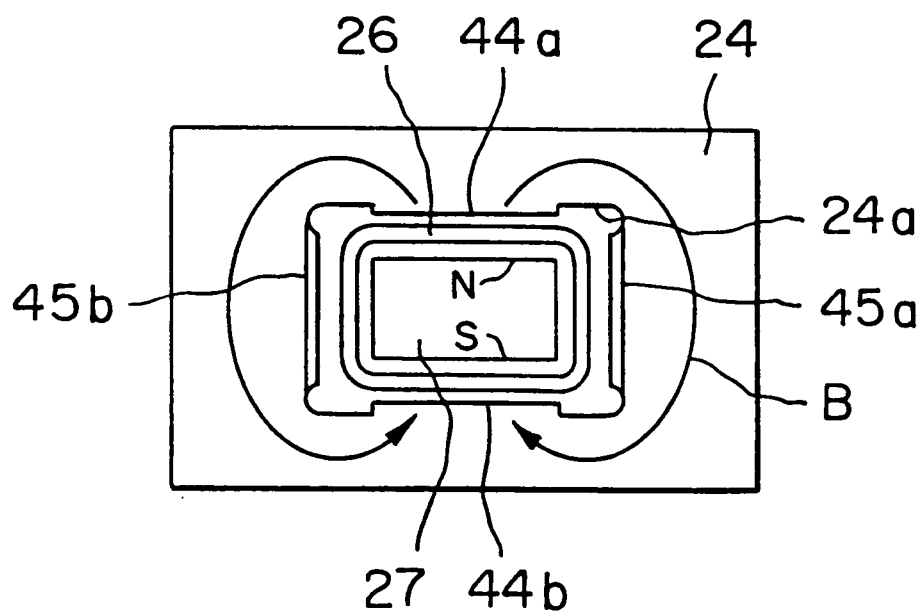
FIG. 3 is a plan view for explaining a magnetic circuit of a galvanomirror serving as the third preferred embodiment of an optical deflector according to the present invention.

FIG. 3 shows a principal part of the third preferred embodiment of an optical deflector according to the present invention.

As shown in FIG. 3, in the third preferred embodiment of the present invention, (second) overhanging portions 45a and 45b are formed on surfaces of an opening 24 of a yoke 24, which do not face N and S pole surfaces (polarized surfaces) of a magnet 27, and the overhanging portions 45a and 45b are made of a non-magnetic material (e.g., a resin). The overhanging portions 45a and 45b may be adhered to the yoke 24 so as to project from the yoke 24.

The reason why the overhanging portions 45a and 45b of a non-magnetic material are provided is as follows.

That is, damping materials 29a and 29b of, e.g., silicon gel (see FIG. 13B), are filled in portions, through which the lines of magnetic force leaving the magnet 27 do not pass, in order to prevent a mirror 20 from being vibrated by disturbance vibration. Since such damping materials of silicon gel or the like have good damping characteristics when the gaps filled with the damping materials are narrow, it is required to narrow the gaps between the yoke 24 and the bobbin 23.

Thus, although it is required to narrow the gaps between the yoke 24 and the bobbin 23 in order to fill the gaps with the damping materials 29a and 29b, there is a problem in that if the gaps are narrowed, the flow of the lines of magnetic force forming the original magnetic circuit leaks to enter the gaps, which are narrowed in order to fill the gaps with the damping materials, to deteriorate the efficiency of the magnetic circuit.

Therefore, in the third preferred embodiment of the present invention, the overhanging portions 45a and 45b provided for filling the damping materials 29a and 29b of silicon gel or the like are made of a non-magnetic material, so that there is no possibility that the lines of magnetic force B leaving the N pole surface of the magnet 27 leak out of the overhanging portions 45a and 45b to reach the S pole surface as shown in FIG. 3. Thus, it is possible to prevent the leakage flux while maintaining the narrow gaps, and it is possible to improve the efficiency of the magnetic circuit formed in the yoke 24.

Furthermore, in the third preferred embodiment, if the overhanging portions 45a and 45b, together with the overhanging portions 44a and 44b in the second preferred embodiment, are used as shown in FIG. 3, it is possible to further improve the efficiency of the magnetic circuit.

Fourth Preferred Embodiment

Figure 4:
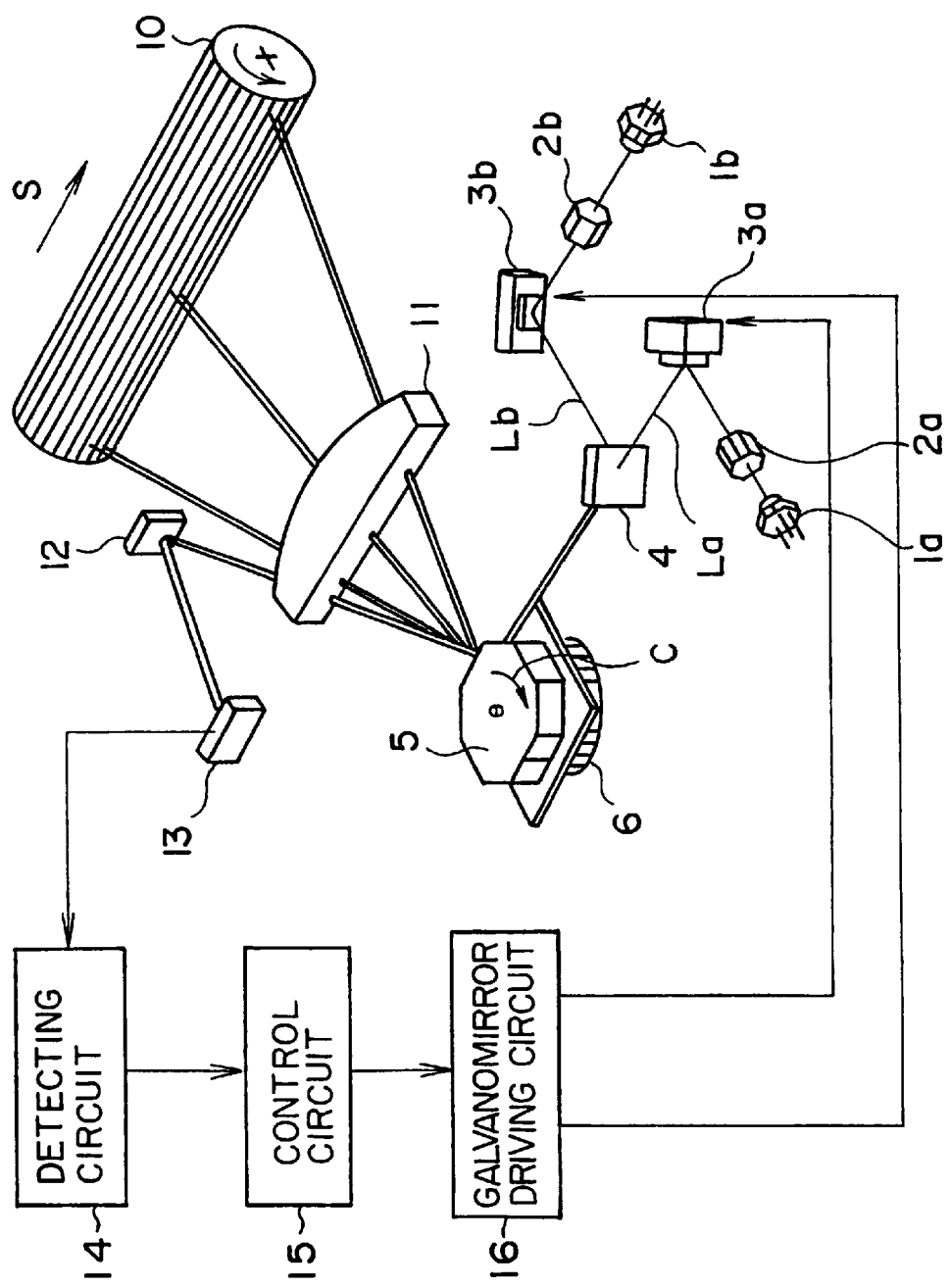
FIG. 4 is a schematic view of the fourth preferred embodiment of a beam scanner (a multi-beam scanner) according to the present invention.

If the optical deflector in any one of the first through third preferred embodiments is applied to, e.g., a multi-beam scanner shown in FIG. 4, and if this multi-beam scanner is mounted in a copying machine, it is possible to record a high quality picture having no picture deterioration.

FIG. 4 shows a multi-beam scanner, which is mounted in a laser printer or a copying machine having a laser printer in a recording portion, for writing laser beams on a sensitizing drum in accordance with manuscript information. The optical deflectors in any one of the first through third preferred embodiments are built in the multi-beam scanner as galvanomirrors 3a and 3b.

While the multi-beam scanner shown in FIG. 4 has two laser light sources 1a and 1b, it may have two or more laser light sources.

In FIG. 4, each of the laser light sources 1a and 1b comprises a semiconductor laser diode, which is pulse-width-modulated to turn lights on and off in accordance with picture information to be recorded. The scattered lights emitted from the laser light sources 1a and 1b turn to parallel rays by means of finite lenses 2a and 2b. The laser beams La and Lb passing the finite lenses 2a and 2b are deflected by galvanomirrors 3a and 3b, each of which can optionally change the angle of reflection by an electric signal. The two deflected laser beams La and Lb are synthesized by means of a half mirror 4 so as to have the same pitch as the printer resolution on the surface (a predetermined image surface) of a sensitizing drum 10. For example, when the resolution is 600 dpi (dots per inch), the pitch is 42 $\mu$m.

The synthesized two laser beams La and Lb are simultaneously scanned on the surface of the sensitizing drum 10 by means of a polygon mirror (a scanner) 5 of an octahedron rotating at a high speed. The polygon mirror 5 is rotated in a direction of arrow C by means of a polygon motor 6.

The two laser beams La and Lb scanned by the polygon mirror 5 pass an f-$\theta$ lens 11 so as to form an image on the sensitizing drum 10, to be scanned in the main (or horizontal) scanning direction (in the direction of arrow S). A reflecting mirror 12 for leading the laser beams La and Lb to a sensor 13, which is provided for detecting the positions of the laser beams La and Lb in the horizontal and vertical scanning directions, is provided on the scan starting side in a laser beam scanning range beyond the image region of the sensitizing drum 10.

The sensor 13 is located so that the focuses of the two laser beams La and Lb are coincident with each other on the surface of the sensitizing drum 10 and on the sensor 13. The recording of a picture on the surface of the sensitizing drum 10 is carried out in synchronism with position detecting signals of the sensor 13 in the scanning directions of the two laser beams La and Lb.

That is, in the laser light sources 1a and 1b, the modulation of the laser beams is started in accordance with an image video signal in a predetermined period of time after a horizontal-scanning direction detecting signal is outputted from the sensor 13. Thus, the image on the surface of the sensitizing drum 10 is correctly formed in a direction perpendicular to the laser beam scanning direction. Furthermore, in FIG. 4, a control circuit for carrying out the laser modulation for image recording in accordance with the image video data in synchronism with the horizontal-scanning direction detecting signal outputted from the sensor 13 is omitted.

The pitches of the two laser beams La and Lb on the surface of the sensitizing drum 10 in a direction perpendicular to the scanning direction (in the vertical scanning direction) are set to be the same as the printer resolution. The pitch accuracy is required to be equal to or less than a few microns so as not to deteriorate the recorded picture quality. However, since the laser beams La and Lb are expanded by 20 to 60 until reaching the sensitizing drum 10 from the laser light sources 1a and 1b and since the laser light sources 1a and 1b are separately mounted in housings, it is impossible to maintain the pitch accuracy of the laser beams by only the adjustment during the mounting thereof.

Therefore, the sensor 13 and a detecting circuit 14 detect the image forming positions of the two laser beams La and Lb on the sensitizing drum 10 to obtain a deviation from a set value. On the basis of a deviation signal, a control circuit 15 produces a control signal for controlling the galvanomirrors 3a and 3b, which are located in the optical path of the respective laser beams La and Lb to change the image forming positions of the laser beams.

This control signal is fed back to a galvanomirror driving circuit 16 to control the rotation angles of the galvanomirrors 3a and 3b to hold the image forming positions of the laser beams La and Lb at predetermined values, so as to accurately hold the pitch between the laser beams La and Lb. The galvanomirrors 3a and 3b rotate so that the laser beams La and Lb move in the vertical scanning directions.

Figure 5:
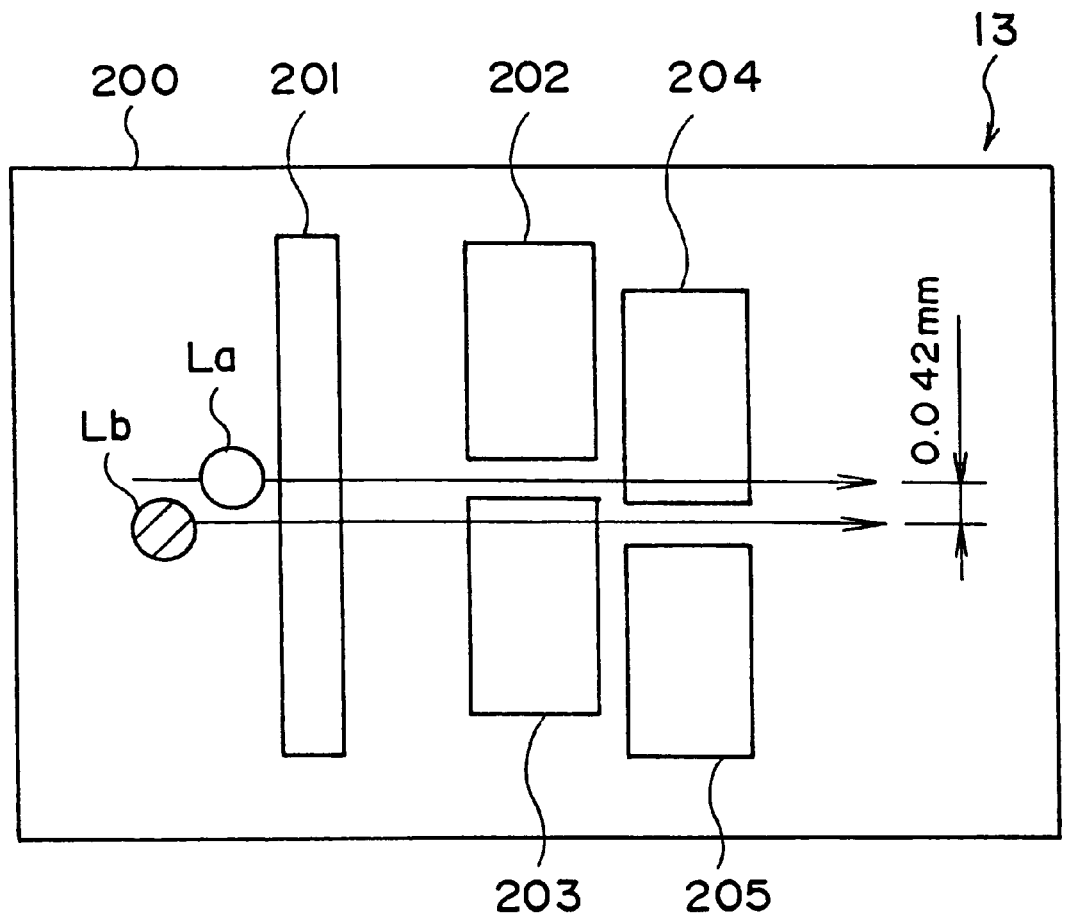
FIG. 5 is a schematic view showing a light receiving surface of a sensor for detecting the image formation position of a laser beam, which is used for a multi-beam scanner.

FIG. 5 is a schematic view of the light receiving surface of the sensor 13 for detecting the image forming positions of laser beams on the surface of the sensitizing drum 10.

The sensor 13 has a light receiving surface 200 comprising a photodiode (a laser light receiving element). The sensor 13 herein comprises five light receiving portions 201, 202, 203, 204 and 205 formed on a photodiode of one chip.

When the light receiving portions 201, 202, 203, 204 and 205 are irradiated with laser beams while a bias is applied between a cathode and an anode, an electric current flows the terminals connected to the respective light receiving portions 201, 202, 203, 204 and 205, and the current value thereof changes in accordance with the quantity of laser light. The light receiving portions 202 and 203 are provided for detecting the image forming position of one laser beam La in the vertical scanning direction. The surfaces of the rectangular light receiving portions face each other so as to be spaced from each other by a gap of about 0.01 mm. When the laser beam La is scanned over the two light receiving portions 202 and 203, it is possible to detect the deviation from the gap center of the light receiving portions 202 and 203.

A detection signal corresponding to the deviation from the gap center is fed back to the driving circuit 16 for driving the galvanomirror 3a, which is provided for deflecting the optical axis of the laser beam La, via the control circuit 15 to control the laser beam a so that the laser beam La always passes over the gap center between the light receiving portions 202 and 203.

The other laser beam Lb is also controlled in the same manner. In this case, since the image forming position of the laser beam Lb in the vertical scanning direction is detected, the light receiving portions 204 and 205 face each other so as to be spaced from each other by a gap of 0.01 mm, and the gap center between the light receiving portions 204 and 205 is set so as to be spaced, by 0.042 mm, from the gap center between the light receiving portions 202 and 203, which are provided for detecting the laser beam La. The pitch between the laser beams La and Lb is set so as to be equal to a dot pitch of 0.042 mm corresponding to the printer resolution 600 dpi by controlling the laser beam Lb so that the laser beam Lb always passes over the gap center between the light receiving portions 204 and 205.

The light receiving portion 201 is provided for detecting the passing timing of each of the laser beams La and Lb in the horizontal scanning direction. The laser modulation for recording a picture is carried out in synchronism with a signal obtained by the receiving portion 201.

The numbers of the laser light sources 1a and 1b and the galvanomirrors 3a and 3b may be suitably set to be two sets as shown in FIG. 4, or three or more sets, e.g., four sets, if necessary, in accordance with the performance necessary for a printer or a copying machine, in which the multi-beam scanner is provided.

Thus, if the galvanomirrors 3a and 3b serving as the optical deflectors in any one of the first through third preferred embodiments are built in the multi-beam scanner shown in FIG. 4, it is possible to record a high quality picture having no picture deterioration.

The present invention should not be limited to the first through fourth preferred embodiments. For example, a so-called moving magnet system may be used wherein, out of the driving mechanisms for producing the rotation force, the coil 26 is arranged on the magnet fixing plate 28, not on the mirror 20, and the magnet 27 is integrated with the mirror 20 so that the magnet 27 rotates with the mirror 20.

In a case where an optical deflector is provided in a copying machine or the like in the fourth preferred embodiment, it is known that when the resonance frequencies of the galvanomirrors 3a and 3b serving as the optical scanners are coincident with the rotational frequency of the motor used for the copying machine or the like and with rotational frequencies integer times or one-to-integer as large as the rotational frequency of the motor, resonance occurs to vibrate the galvanomirrors 3a and 3b, so that the galvanomirrors 3a and 3b can not have desired performance. In particular, since the polygon motor 6, which is provided in the same optical unit as that for the galvanomirrors 3a and 3b, is arranged nearest the galvanomirrors 3a and 3b, there is some possibility that the polygon motor 6 resonates with the galvanomirrors 3a and 3b when the rotational frequency of the polygon motor 6 and the rotational frequencies integer times or one-to-integer as large as the rotational frequency of the polygon motor 6 are coincident with or approximate to the resonance frequencies of the galvanomirrors 3a and 3b.

Figure 6:
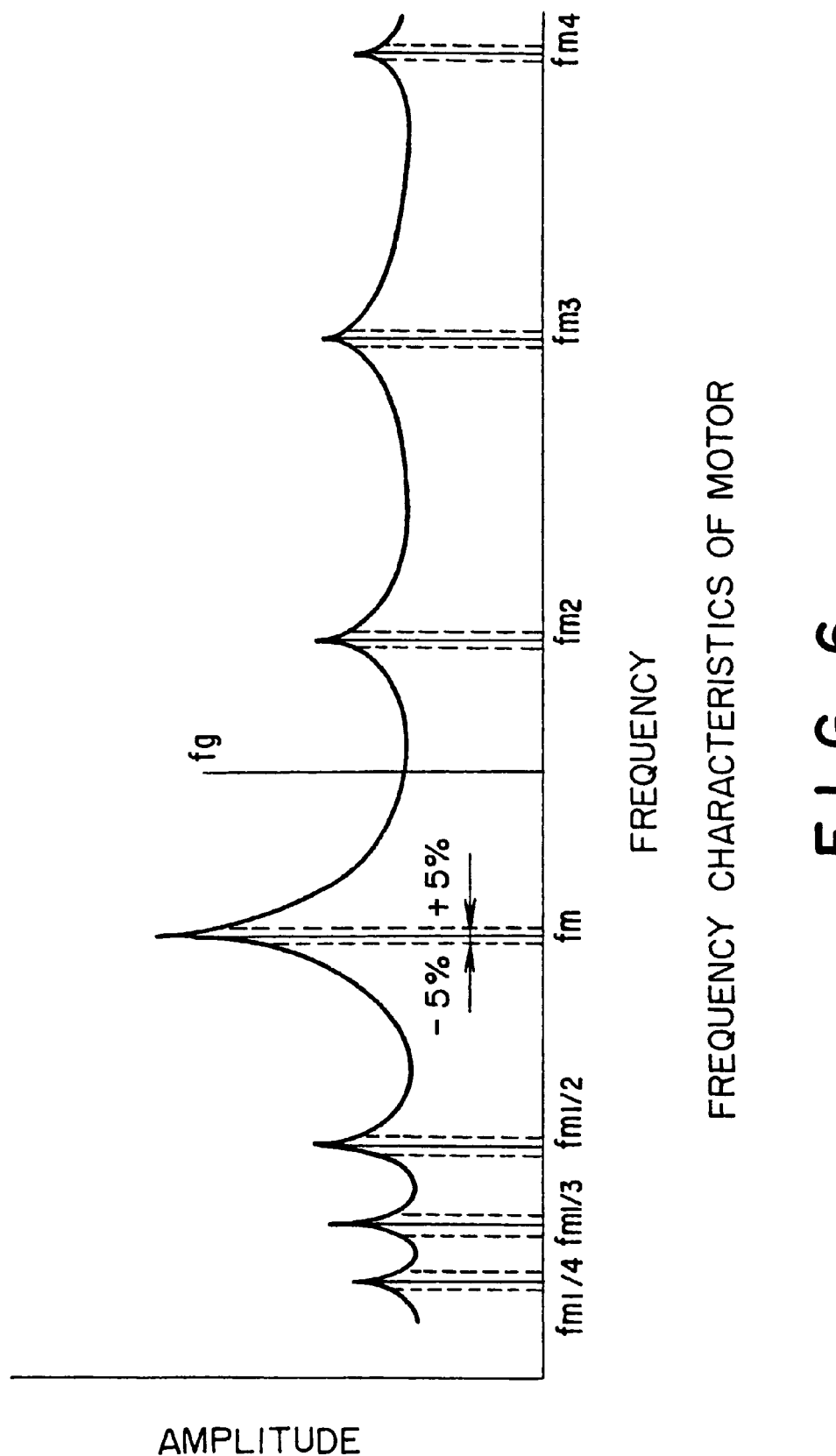
FIG. 6 is a graph showing the frequency characteristics of a motor for use in a multi-beam scanner.

FIG. 6 shows the relationship between the rotational frequency of the polygon motor 6, which is one of a plurality of motors for use in a copying machine having optical deflectors and which is located nearest the galvanomirrors 3a and 3b serving as the optional deflectors, and rotational frequencies integer times or one-to-integer as large as the rotational frequency of the polygon motor 6, and the amplitude of vibration at the respective rotational frequencies.

As can be seen from FIG. 6, when the polygon motor 6 rotates at a predetermined rotational frequency, the polygon motor 6 vibrates most greatly at the predetermined rotational frequency $f_m$, and there are peaks of amplitude of vibration at the rotational frequencies integer times or one-to-integer as large as the predetermined rotational frequency so that the polygon motor 6 tends to vibrate. While there are shown herein frequencies up to the frequency $f_{m4}$ four times and the frequency $f_{m\frac{1}{4}}$ one-fourth as large as the rotational frequency $f_m$ of the polygon motor 6, there are frequencies, at which the peaks of vibration exist so that the motor tends to vibrate, in a wider range of magnification.

Thus, the polygon motor 6 has vibrational components based on the rotational frequency thereof. When this rotational frequency $f_m$ and rotational frequencies integer times or one-to-integer as large as the rotational frequency $f_m$ are coincident with the resonance frequency $f_g$ of the galvanomirrors 3a and 3b having the frequency characteristics shown in FIG. 7, resonance occurs and the mirror 20 vibrates greatly, so that it is not possible to accurately carry out the printing.

At this point, the inventors were verified that as shown in FIG. 6, it is possible to avoid such undesired resonance by setting the resonance frequency $f_g$ of the galvanomirrors 3a and 3b so as to be beyond the limits of ±5% of the rotational frequency $f_m$ of the polygon motor 6 and rotational frequencies integer times or one-to-integer as large as the rotational frequency $f_m$.

That is, assuming that a rotational frequency based on the rotational frequency of the motor is $f_{mi}$, if the resonance frequency $f_g$ of the galvanomirrors 3a and 3b is designed so as to meet the following conditions, it is possible to carry out stable printing without causing resonance.

$$|f_g - f_{mi}|/f_g > 0.05$$

(i= . . . , ¼, ⅓, ½, 1, 2, 3, 4, . . . )

While the rotational frequency of the polygon motor 6 has been described as an example of disturbance vibration, it is the same with other motors provided in a copying machine, e.g., a motor for driving a sensitizing drum, a motor for driving a heat roller of a fixing device, a motor for driving a carriage of a scanner, and a motor for transporting papers.

It is also the same when a plurality of motors rotate at different rotational frequencies. That is, while the rotational frequency characteristics of only the polygon motor 6 have been shown in FIG. 6, when a plurality of motors rotate at different rotational frequencies, it is possible to obtain graphs of frequency characteristics, the number of which is the same as the number of motors, and the rotational frequency of each of the motors has peaks of vibration. In this case, if the resonance frequency $f_g$ of the galvanomirrors 3a and 3b is set so as to be beyond the limits of ±5% of the rotational frequency of each of the motors and rotational frequencies integer times or one-to-integer as large as the rotational frequency of each of the motors, it is possible to avoid resonance, so that it is possible to carry out stable printing.

In addition, since there is resonance caused by the frequencies of the housings of motors themselves and so forth, not the rotational frequencies of the motors, it is possible to carry out more stable printing by designing the resonance frequency $f_g$ of the galvanomirrors in view of the frequencies of the housings and so forth.

In the first through fourth preferred embodiments, the mirror 20 of each of the galvanomirrors 3a and 3b rotates when a current flows the coil 26. When the current flows the coil 26, Joule heat is generated in accordance with the resistance of the coil 26. When the coil 26 generates heat, there is some possibility that the torsion bar springs 22a and 22b of the plate spring 21 deforms by thermal expansion, so that it is required to prevent heat generation. The temperature rise of the coil 26 depends upon the material, diameter of the wire and number of turns of the coil 26, load and the magnetic circuit, and finally depends upon the resistance of the coil 26 and the current flowing the coil 26. Therefore, it is required to design the galvanomirror meeting predetermined conditions so that the coil 26 does not generate heat.

At this point, the inventors were verified that the temperature rise of the coil 26 can be decreased when the coil 26 is made of copper, the diameter of the wire of the coil 26 being in the range of from 0.06 to 0.07 mm, the number of turns of the coil 26 being in the range of from 400 to 600 turns, and the value of resistance of the coil 26 being in the range of from 70 to 120 Ω.

FIG. 8 shows the results of the temperatures of coils 26 themselves when a current required to only rotate the mirror 20 flows each of the coils 26, with respect to two kinds of coils 26, one of which has a wire diameter of 0.06 mm, a number of turns of 408 and a resistance of 79 Ω, and the other of which has a wire diameter of 0.06 mm, a number of turns of 540 and a resistance of 105 Ω.

As can be seen from FIG. 8, when the mirror 20 rotates by 10 m[rad] which is the maximum displacement angle of the mirror 20, the current value is about 0.055 A and the temperature rise is about 20° C. in the case of 408 turns, and the current value is about 0.038 A and the temperature rise is about 15° C. in the case of 540 turns, so that the temperature rise of the coil 26 does not exceed a criterion of the temperature rise of the coil 26 (temperature rise $\Delta T \leq 60°$ C.)

Fifth Preferred Embodiment

Figure 9:
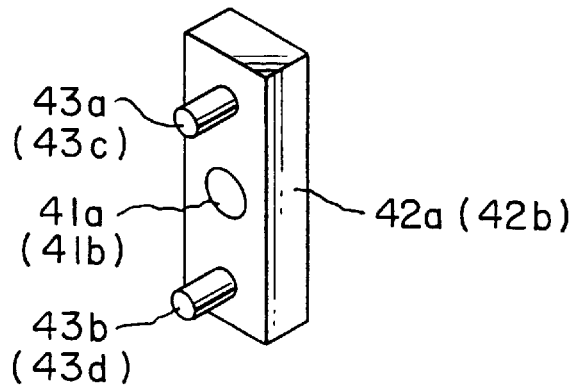
FIG. 9 is a perspective view for explaining a first modification of a method for fixing a plate spring (a supporting member) shown in FIG. 1.
Figure 10:
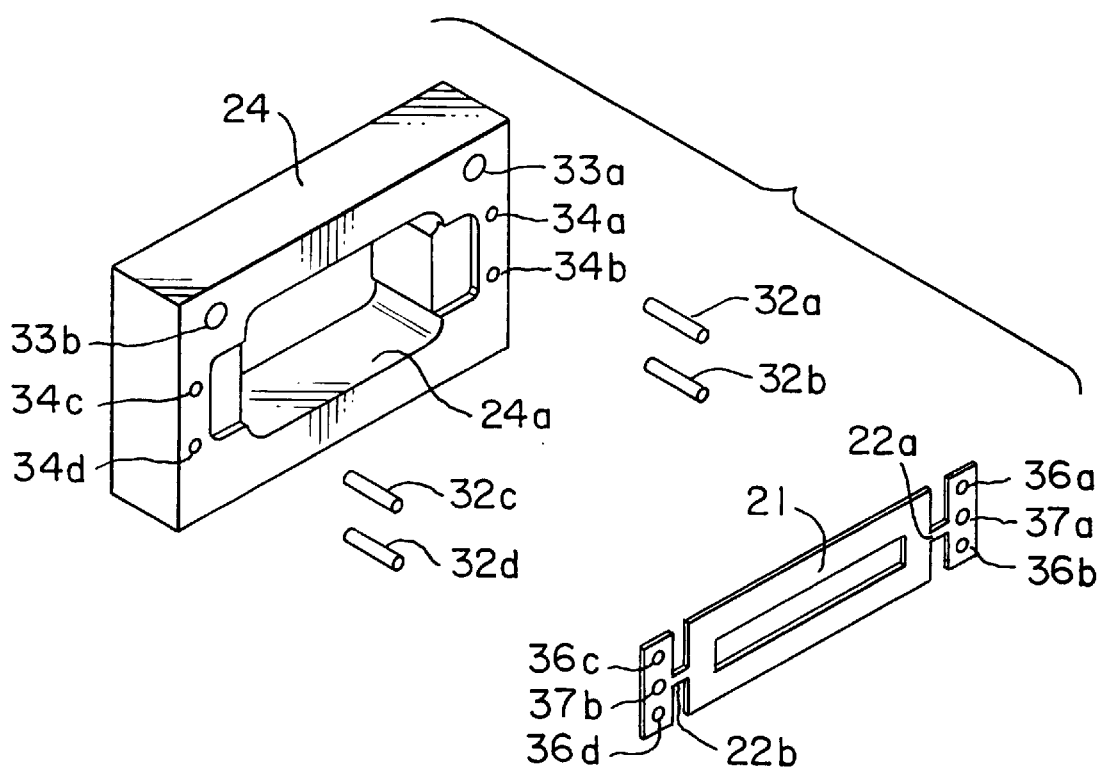
FIG. 10 is a perspective view for explaining a second modification of a method for fixing a plate spring (a supporting member) shown in FIG. 1.

FIGS. 9 and 10 are perspective views for explaining modifications of methods for fixing the plate spring 21 shown in FIG. 1.

First, referring to FIG. 9, the first modification of a method for fixing the plate spring 21 will be described.

Figure 14:
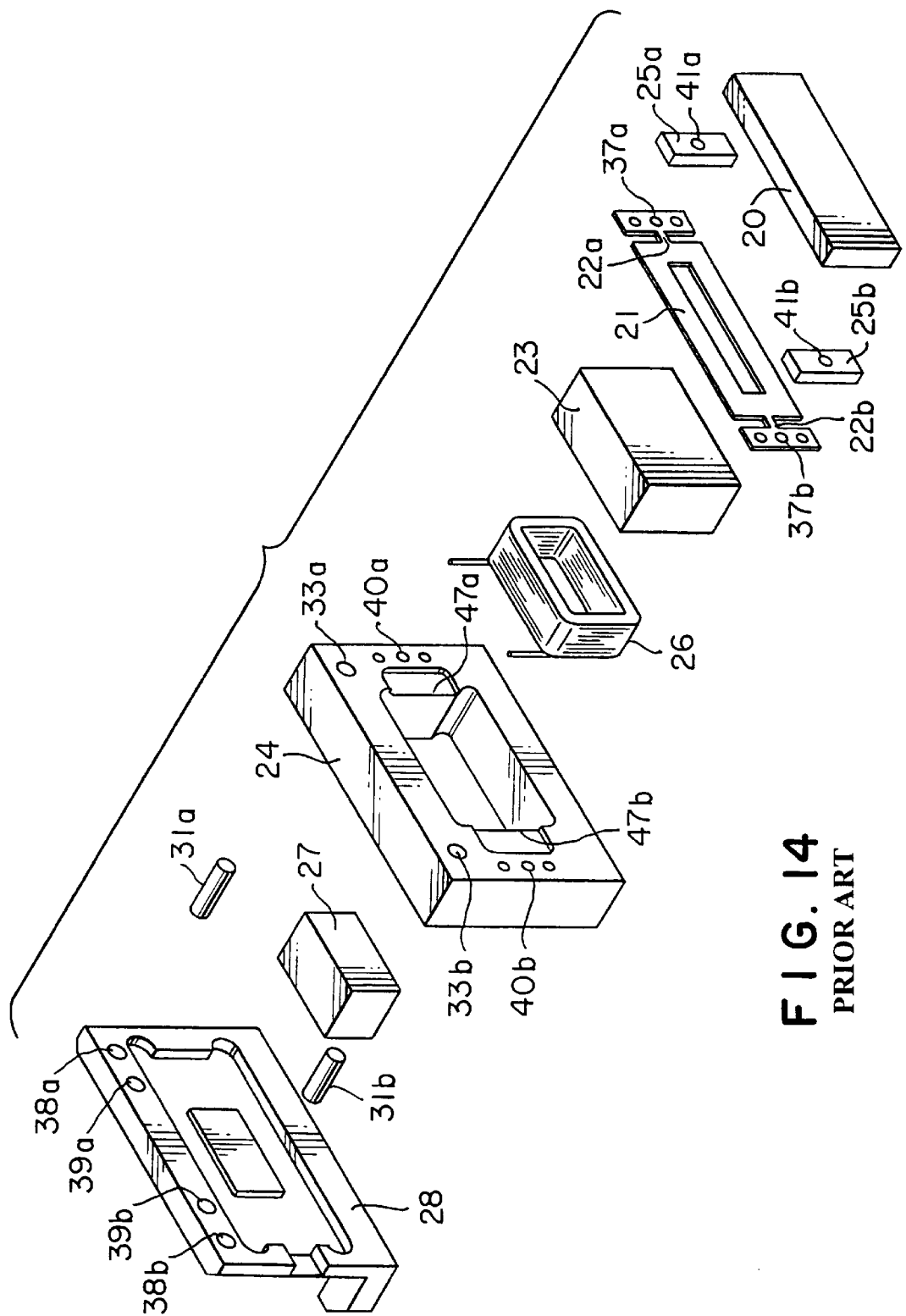
FIG. 14 is an exploded perspective view of the galvanomirror serving as the optical deflector for use in the conventional multi-beam scanner.
Figure 15:
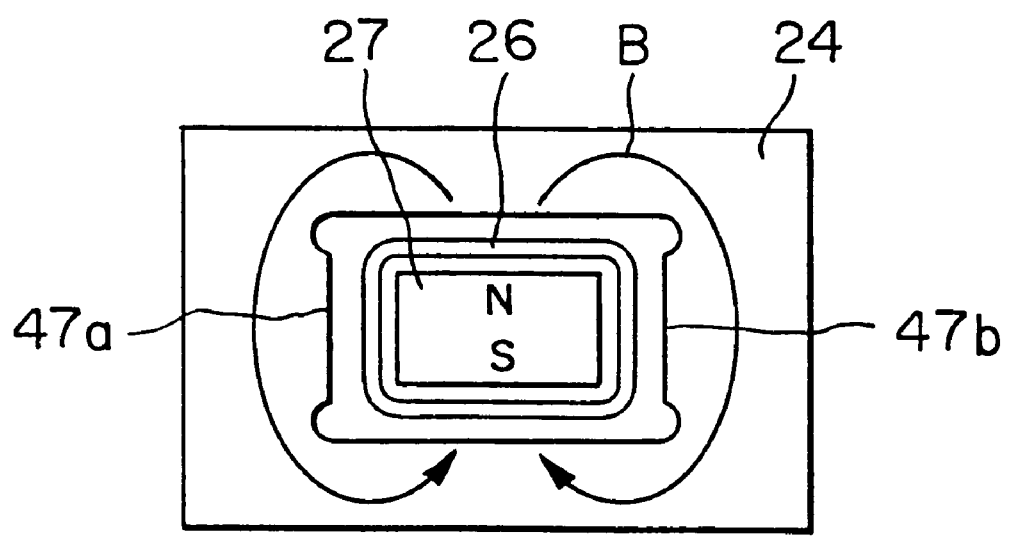
FIG. 15 is a plan view for explaining a magnetic circuit of the galvanomirror serving as the optical deflector for use in the conventional multi-beam scanner.

As shown in FIG. 9, a plate spring presser member 42a has positioning projections 43a and 43b provided in, e.g., the plate spring presser member 25a shown in FIG. 14. Similarly, another plate spring presser member 42b has positioning projections 43c and 43d provided in, e.g., the plate spring presser member 25b shown in FIG. 14.

These positioning projections 43a, 43b, 43c and 43d correspond to the positioning pins 32a, 32b, 32c and 32d shown in FIG. 1. The plate spring presser members 42a and 42b are provided with screwing holes 41a and 41b between the positioning holes 43a and 43b and between the positioning holes 43c and 43d, respectively.

These positioning projections 43, 43b, 43c and 43d of the plate spring presser members 42a and 42a are used in place of the positioning pins 32a, 32b, 32c and 32d shown in FIG. 1. That is, the positioning projections 43a, 43b, 43c and 43d of the plate spring presser members 42a and 42b are inserted into the positioning holes 36a, 36b, 36c and 36d of the plate spring 21 and the positioning holes 34a, 34b, 34c and 34d of the yoke 24 to temporarily fix the plate spring 21 to the yoke 24.

If the plate spring 21 is thus temporarily fixed to the yoke 24, undesired stress, such as torsional force, is not applied to the torsion bar springs 22a and 22b serving as torsion springs of the plate spring 21 when the plate spring 21 is fixed to the yoke 24 by means of screws, similar to the method using the positioning pins 32a, 32b, 32c and 32d shown in FIG. 1, so that it is possible to prevent the torsion bar springs 22a and 22b from being bent when the plate spring 21 is fixed to the yoke 24 by means of the screws.

The plate spring presser members 42a and 42b are made of, e.g., a resin, and the weight thereof is relatively light, so that there is no disadvantage with respect to the driving force and so forth in comparison with the embodiment shown in FIG. 1.

In comparison with the use of the positioning pins 32a, 32b, 32c and 32d shown in FIG. 1, when the plate spring presser members 42a and 42b shown in FIG. 9 are used, the plate spring 21 can be pressed by the whole surfaces of the plate spring presser members 42a and 42b, so that it is possible to efficiently prevent the undesired movement of the plate spring 21 when the plate spring 21 is temporarily fixed.

In addition, in comparison with the use of the positioning pins 32a, 32b, 32c and 32d shown in FIG. 1, when the plate spring presser members 42a and 42b shown in FIG. 9 are used, the positioning projections 43a and 43b or the positioning projections 43c and 43d can be simultaneously inserted into the positioning holes 36a and 36b or the positioning holes 36c and 36d of the plate spring 21 by only the engagement of the plate spring presser members 42a and 42b with the plate spring 21, since the plate spring presser members 42a and 42b are integrated with the positioning projections 43a, 43b, 43c and 43d. Therefore, it is possible to simplify the assembly process in comparison with the case that the positioning pins 32a, 32b, 32c and 32d are inserted into the positioning holes 36a, 36b, 36c and 36d, respectively, one by one.

Referring to FIG. 10, the second modification of a method for fixing the plate spring 21 will be described below.

As shown in FIG. 10, the plate spring 21 can be fixed to the yoke 24 by the spot welding as a method other than the screwing shown in FIG. 1.

In this case, after the positioning pins 32a, 32b, 32c and 32d are inserted into the positioning holes 36a, 36b, 36c and 36d of the plate spring 21 and the positioning holes 34a, 34b, 34c and 34d of the yoke 24, the plate spring 21 and the yoke 24 are welded together using spot welding holes 37a and 37b formed in the plate spring 21.

Thus, the plate spring 21 can be fixed to the yoke 21 without the need of screws, while preventing the torsion bar springs 22a and 22b serving as torsion springs from being bent.

Thus, according to the method for fixing the plate spring 21 shown in FIG. 10, it is possible to achieve a stable assembly process while preventing undesired stress, such as torsional force, from being applied to the torsion bar springs 22a and 22b of the plate spring 21, by carrying out the spot welding after the plate spring 21 is temporarily fixed to the yoke 24 by means of the positioning pins 32a, 32b, 32c and 32d.

Sixth Preferred Embodiment

Figure 11:
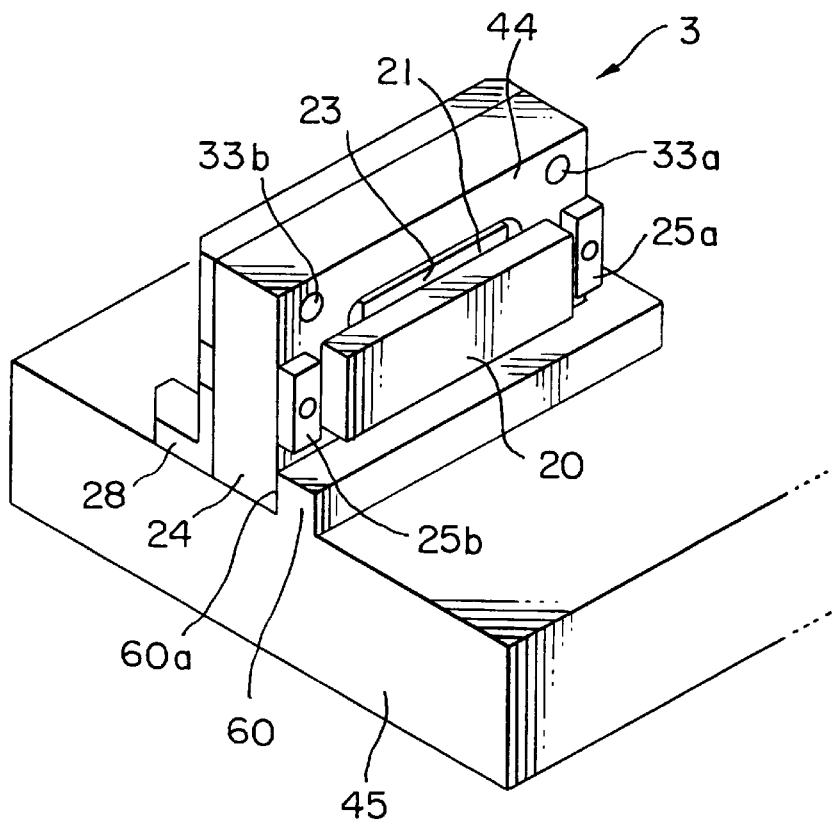
FIG. 11 is a perspective view for explaining the mounting state of a galvanomirror serving as an optical deflector.
Figure 12:
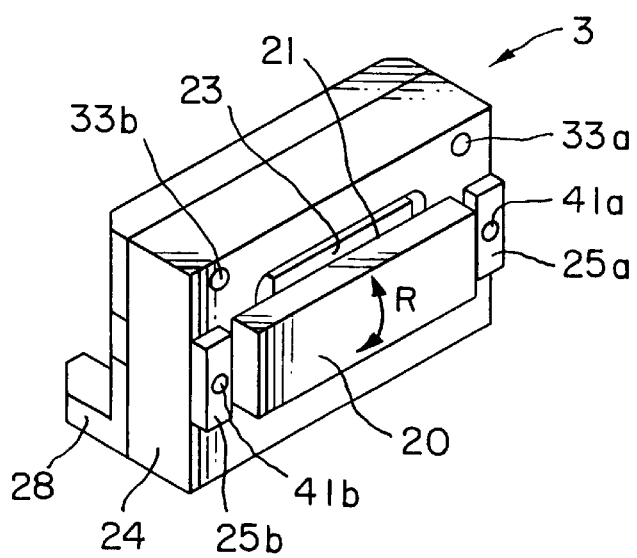
FIG. 12 is a perspective view of a galvanomirror serving as an optical deflector for use in a conventional multi-beam scanner.

FIG. 11 is a view showing the mounting state of an optical deflector shown in FIG. 1.

As shown in FIG. 11, one side of a yoke 24 of a galvanomirror 3 is pressed on one side (a side forming a reference plane) 60a of a L-shaped positioning wall 60 provided on a base 45 of, e.g., a multi-beam optical unit, to be fixed thereto by means of screws, springs or the like, so that the positioning of the galvanomirror 3 is carried out.

That is, the one side 44 of the yoke 24 contacting the positioning wall 60 provided on the base 45 serves as a positioning plane, on which a plate spring 21 is mounted, and a mirror 20 is fixed to the plate spring 21 by adhesion or the like.

Thus, the one side 44 of the yoke 24, on which the plate spring 21 supporting the mirror 20 is mounted, serves as a reference plane for mounting the galvanomirror 3 on the base 45, so that the mirror 20, which should be most accurately positioned when mounting the galvanomirror 3, can be accurately positioned with respect to the base 45.

In conventional mounting methods, when the galvanomirror 3 is mounted on a multi-beam optical unit, the galvanomirror 3 is fixed to the base by means of screws passing through recessed portions 42a and 42b shown in FIG. 13B, so that it is difficult to accurately mount the galvanomirror 3 on the base 45. In addition, it is required to rotate and sway the body of the galvanomirror 3 to carry out the fine adjustment thereof to adjust the mounting error while checking the position of the laser beam by the optical adjustment after the mounting of the galvanomirror 3, so that it takes a lot of time to carry out the optical adjustment. In particular, since a multibeam optical system uses a plurality of laser beams, the time necessary for the optical adjustment depends upon the number of the galvanomirrors 3. However, according to the mounting method shown in FIG. 11, it is possible to improve the mounting accuracy of the galvanomirror 3 on the base 45, and it is possible to decrease the time necessary for the optical adjustment in the multi-beam optical system.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An optical deflector comprising:

a light deflecting member having a reflecting surface for reflecting light;

a supporting member for supporting said light deflecting member;

a yoke for holding said supporting member, said yoke having a positioning hole;

a driving mechanism for rotating said light deflecting member with respect to said yoke;

a base for supporting said yoke; and a positioning member connected to said yoke and said base, being made of a magnetic material, for positioning said yoke with respect to said base at least one part of said positioning member being inserted into the positioning hole of said yoke.

2. The optical deflector according to claim 1, wherein said driving mechanism forms a magnetic circuit in said yoke.

3. An optical deflector comprising:

a light deflecting member having a reflecting surface for reflecting light;

a supporting member for supporting said light deflecting member;

a yoke for holding said supporting member, said yoke having an opening; and a driving mechanism, located in said opening of said yoke, for rotating said light deflecting member with respect to said yoke, said driving mechanism having a magnet and a coil, wherein an overhanging portion of a non-magnetic material projects from a first surface of a said opening of said yoke, said first surface not facing a polarized surface of said magnet.

4. The optical deflector according to claim 3, wherein an additional overhanging portion projects from a second surface of said opening of said yoke, said second surface facing a polarized surface of said magnet.

5. A beam scanner comprising:

a plurality of light sources;

a plurality of optical deflectors for deflecting an emitting light from each of said light sources in a predetermined direction; and a scanner for scanning the light deflected by each of said optical deflectors, on a predetermined image surface at a constant speed, each of said optical deflectors having a light deflecting member having a reflecting surface for reflecting light, a supporting member for supporting said light deflecting member, a yoke for holding said supporting member, said yoke having a positioning hole, a driving mechanism for rotating said light deflecting member with respect to said yoke, a base for supporting said yoke, and a positioning member connected to said yoke and said base, being made of a magnetic material, for positioning said holding member with respect to said base, at least one part of said positioning member being inserted into the positioning hole of said yoke.

6. The optical deflector according to claim 5, wherein said driving mechanism forms a magnetic circuit in said yoke.

7. A beam scanner comprising:

a plurality of light sources;

a plurality of optical deflectors for deflecting an emitting light from each of said light sources in a predetermined direction; and a scanner for scanning the light deflected by each of said optical deflectors, on a predetermined image surface at a constant speed, each of said optical deflectors having a light deflecting member having a reflecting surface for reflecting light, a supporting member for supporting said light deflecting member, said yoke for holding said supporting member, said yoke having an opening, and a driving mechanism, located in said opening of said yoke, for rotating said light deflecting member with respect to said yoke, said driving mechanism having a magnet and a coil, wherein an overhanging portion of a non-magnetic material projects from a first surface of said opening of said yoke, said first surface not facing a polarized surface of said magnet.

8. The beam scanner according to claim 7, wherein an additional overhanging portion projects from a second surface of said opening of said yoke, said second surface facing a polarized surface of said magnet.

* * * * *